Patented Sept. 3, 1940

2,213,332

UNITED STATES PATENT OFFICE 2,213,332

ABRASIVE ARTICLES AND THE METHOD OF MANUFACTURING THE SAME

Albert L. Ball, Lewiston Heights, N. Y., assignor, by mesne assignments, to The Carborundum Company, Niagara Falls, N. Y., a corporation of Delaware No Drawing. Application November 29, 1935, Serial No. 52,195. Renewed November 2, 1938

7 Claims. (Cl. 51—273)

This invention relates to abrasive articles and to methods of manufacturing the same. The invention relates more particularly to methods of increasing the water resistance of abrasive articles containing very hard and costly abrasive material (such as diamond particles) and to the improved article resulting from the method of manufacture disclosed below.

As an illustration of some of the difficulties that have been encountered in the past in the manufacture of abrasive articles containing very hard and costly material, the art of manufacture of diamond wheels will be referred to briefly. Such wheels have been made in recent years by bonding diamond particles by means of a synthetic resin which can be hardened by heat. Two of the principal difficulties encountered in the development of this art are to be found in:

(a) The relatively rapid loosening of the abrasive particles from the resinous bonds, especially where the wheels are used wet;

(b) The long periods of time required in molding and baking resin-bonded articles in which heat is used to set the bond.

In accordance with the present invention a marked improvement in the water resistance of phenolic condensation product resin bonds has been obtained by adding alkaline oxides or hydroxides to the heat hardenable resin in the process of manufacture of abrasive wheels. Presumably these chemicals illustrate the action of a bond accelerator; that is, a substance which materially hastens the thermo-setting of the bond and perhaps modifies the properties of the bond. At the same time it has been found possible to shorten the time devoted to curing the bond. As a preliminary step in the formation of the abrasive mix, the abrasive granules are coated with a thin adherent layer of an alkaline adhesive, such as a sodium silicate solution, which wets the surfaces of the abrasive particles very completely. The coated granules are then mixed with phenolic condensation product resin and such filler constituents as may be considered necessary for the wheel structure. The wheel is molded by means of pressure exerted by hot platens. By using suitable pressures and temperatures a wheel is obtained in which the bond is well cured and which is more than ordinarily resistant to the disintegrating action of water. Although the layer of alkaline substance on the abrasive particles may be relatively thin, it nevertheless represents a high percentage of alkaline material with respect to the amount of resinous substance immediately adjacent the abrasive particles.

The alkaline material added to the abrasive particles need not constitute the whole alkaline content of the abrasive mix mentioned above. An improvement in some cases can be obtained by adding to the resinous material about one-tenth of its weight of powdered calcium oxide or calcium hydroxide.

An example of an abrasive mix made up in accordance with the present invention is given by the following table:

| Constituents | Percentage of total composition |
| --- | --- |
| Abrasive particles | 20 |
| Sodium silicate precoat on particles | 1 |
| Powdered synthetic resin | 25 |
| Powdered CaO | 2.5 |
| Filler (quartz 200 mesh and finer) | 51.5 |

The expression 200 mesh defines the number of meshes per linear inch.

As an indication of the saving of time effected by the addition of alkaline constituents to the abrasive mix in the manner described above, it may be mentioned that such addition reduced the time of heat treatment from 16 hours to 1 hour. In both cases the curing temperature was 350° Fahrenheit, and the pressure to which the abrasive mixture was subjected was 2000 pounds per square inch.

As an indication of improvement in water resistance effected by the process of manufacture described in detail above, it can be stated that certain briquettes joined by a resin bond having a percentage of alkaline material showed a tensile strength of 1500–1800 pounds per square inch after three (3) months immersion in boiling water. Similar articles that did not have the alkaline material in the resin showed a tensile strength in the resin joints of 100–200 pounds per square inch after a few days immersion in boiling water.

No complete explanation can be given here of the causes of the improvements in the resin bond noted above. It should be noted, however, that the alkaline material that is applied to the abrasive particles wets them very thoroughly, possibly because greasy impurities are removed and surface tension effects are decreased. Finely divided bonding material therefore spreads to a greater extent over the surfaces of the abrasive particles under the action of pressure and heat than is the case where the abrasive particles are not precoated as described above.

Other alkaline solutions and other alkaline solid materials may be used without departing from the invention which is defined within the compass of the following claims.

I claim:

1. The steps in the method of making an abrasive wheel which comprise wetting abrasive particles with an alkaline silicate solution until the abrasive particles have on the average an alkaline silicate coating amounting to about five per cent of their weight, mixing the coated abrasive particles with powdered, heat hardenable synthetic resin in an amount about equal to that of the abrasive grain together with a mass of inert filler exceeding the mass of the resin, and molding the mixture under pressures exceeding 1000 pounds per square inch and at temperatures exceeding 300° Fahrenheit until the bond is hardened to an infusible state.

2. The steps in the method of making an abrasive wheel which comprise wetting abrasive particles with an alkaline silicate solution until the mass of the alkaline silicate content amounts to a few per cent of the mass of the abrasive grain, mixing the coated grain with a mass of heat hardenable synthetic resin about equal to the mass of the abrasive grain together with an alkaline earth oxide and an inert filler, and molding the mixture under pressures exceeding 1000 pounds per square inch and at temperatures exceeding 300° Fahrenheit until the bond is hardened to an infusible state.

3. The steps in the method of making an abrasive article which comprise wetting abrasive grain over substantially all the grain surfaces with an alkaline silicate solution to form a thin coating, and mixing the coated grain with finely divided synthetic resin together with powdered lime and finely divided quartz, the total mass of the coated abrasive being less than one fourth of the mass of the solid constituents of the abrasive mix, and the mass of the quartz filler constituting more than one third of the mass of the solid constituents of the mix.

4. The steps in the method of making an abrasive article which comprise wetting abrasive grain over substantially all the grain surfaces with a solution of sodium silicate to form a thin coating, and mixing the coated grain with finely divided phenol condensation product resin, together with powdered lime and finely divided quartz, the total mass of the coated abrasive being less than one fourth of the mass of the solid constituents of the abrasive mix, and the mass of the quartz filler constituting more than one third of the solid constituents of the mix.

5. An abrasive article for wet grinding comprising abrasive particles coated with an alkaline silicate, and a bond composed of a heat hardened synthetic resin in combination with an alkaline earth oxide and an inert filler.

6. The steps in the method of making an abrasive article which comprise wetting abrasive particles with an alkaline silicate solution, mixing the coated particles with a heat-hardenable resin in finely divided form, forming an article from the mixture, and heating the article to harden the resin.

7. An abrasive article for wet grinding comprising abrasive particles coated with an alkaline silicate, and a bond composed of a heat hardened synthetic resin.

ALBERT L. BALL.